US008307418B2

(12) United States Patent
Devdhar et al.

(10) Patent No.: US 8,307,418 B2
(45) Date of Patent: Nov. 6, 2012

(54) METHODS, SYSTEMS, AND COMPUTER READABLE MEDIA FOR PROVIDING APPLICATION LAYER FIREWALL AND INTEGRATED DEEP PACKET INSPECTION FUNCTIONS FOR PROVIDING EARLY INTRUSION DETECTION AND INTRUSION PREVENTION AT AN EDGE NETWORKING DEVICE

(75) Inventors: Rakendu Devdhar, Germantown, MD (US); Ashish Sardesai, Rockville, MD (US)

(73) Assignee: GENBAND Inc., Frisco, TX (US)

( * ) Notice: Subject to any disclaimer, the term of this patent is extended or adjusted under 35 U.S.C. 154(b) by 378 days.

(21) Appl. No.: 12/775,454

(22) Filed: May 6, 2010

(65) Prior Publication Data

US 2011/0231924 A1 Sep. 22, 2011

Related U.S. Application Data (60) Provisional application No. 61/314,568, filed on Mar. 16, 2010.

(51) Int. Cl.
    *G06F 17/00* (2006.01)
(52) U.S. Cl. ............... 726/11; 726/12; 726/13; 726/14; 726/22; 726/23; 713/188; 370/235; 370/248
(58) Field of Classification Search ............ 726/11–14, 726/22–25; 713/188; 370/235, 248
See application file for complete search history.

(56) References Cited

U.S. PATENT DOCUMENTS

| 6,321,336 | B1   | 11/2001 | Applegate et al. |
|-----------|------|---------|------------------|
| 6,938,080 | B1   | 8/2005  | Kahveci et al.   |
| 7,260,840 | B2 * | 8/2007  | Swander et al. ............. 726/13 |
| 7,716,729 | B2   | 5/2010  | Bhatia           |

(Continued)

FOREIGN PATENT DOCUMENTS

JP 2006023934 A 1/2006

(Continued)

OTHER PUBLICATIONS

Danhua Guo1, 3, Guangdeng Liao1 , Laxmi N. Bhuyan1, Bin Liu2, Jianxun Jason Ding3, A Scalable Multithreaded L7-filter Design for Multi-Core Servers, ANCS '08 Proceedings of the 4th ACM/IEEE Symposium on Architectures for Networking and Communications Systems pp. 60-68, ACM New York.*

(Continued)

*Primary Examiner* — Taghi Arani
*Assistant Examiner* — Amir Mehrmanesh
(74) *Attorney, Agent, or Firm* — Fogarty, L.L.C.

(57) ABSTRACT

Methods, systems, and computer readable media for an application layer firewall function including an integrated deep packet inspection function for providing early intrusion detection and intrusion prevention at an edge networking device are disclosed. According to one method, steps are performed at a session controller configured to operate at the border of a first network and a second network. The steps include receiving, at an intrusion protection system (IPS) module of the session controller interfacing with modules associated with layers 2 and above of a protocol stack of the session controller, information gathered by modules located at lower layers and associated with an intrusion attempt, vulnerability, or other security policy violation. In response to receiving the information, the IPS module provides at least one of a security policy and a rule to a module located at the most appropriate layer for securing the intrusion attempt, vulnerability, or other security policy violation.

36 Claims, 5 Drawing Sheets

U.S. PATENT DOCUMENTS

| | | | |
|---|---|---|---|
| 7,761,708 B2* | 7/2010 | Swander et al. | 713/166 |
| 8,122,495 B2* | 2/2012 | Ramsey et al. | 726/13 |
| 2002/0157020 A1* | 10/2002 | Royer | 713/201 |
| 2003/0014665 A1 | 1/2003 | Anderson et al. | |
| 2003/0043740 A1 | 3/2003 | March et al. | |
| 2003/0084329 A1 | 5/2003 | Tarquini | |
| 2003/0091042 A1 | 5/2003 | Lor | |
| 2003/0145226 A1* | 7/2003 | Bruton et al. | 713/201 |
| 2004/0193943 A1* | 9/2004 | Angelino et al. | 714/4 |
| 2005/0022010 A1 | 1/2005 | Swandler et al. | |
| 2006/0253908 A1 | 11/2006 | Yang | |
| 2006/0259950 A1* | 11/2006 | Mattsson | 726/1 |
| 2006/0285493 A1 | 12/2006 | Manuja et al. | |
| 2008/0040801 A1 | 2/2008 | Buriano et al. | |
| 2008/0262990 A1* | 10/2008 | Kapoor et al. | 706/20 |
| 2009/0044270 A1* | 2/2009 | Shelly et al. | 726/22 |
| 2010/0287608 A1* | 11/2010 | Khuti et al. | 726/11 |
| 2010/0309794 A1* | 12/2010 | Keynan et al. | 370/252 |

FOREIGN PATENT DOCUMENTS

| | | | |
|---|---|---|---|
| WO | WO 2007/062010 A2 | 5/2007 | |

OTHER PUBLICATIONS

Grant A. Jacoby, Shawn Mosley, Mobile Security Using Separated Deep Packet Inspection,Consumer Communications and Networking Conference, 2008. CCNC 2008. 5th IEEE, pp. 482-487.*
Notice of Allowance and Fee(s) Due for U.S. Appl. No. 11/286,598 (Dec. 24, 2009).
Interview Summary for U.S. Appl. No. 11/286,598 (Oct. 13, 2009).
Final Official Action for U.S. Appl. No. 11/286,598 (May 27, 2009).
Official Action for U.S. Appl. No. 11/286,598 (Sep. 29, 2008).
Notification of Transmittal of the International Search Report and the Written Opinion of the International Authority, or the Declaration of International Application No. PCT/US06/45009 (Feb. 19, 2008).
Hardwick, John "Session Border Controllers Enabling the VOIP Revolution," Data Connection Limited, pp. 38-41 (Feb. 2005).

* cited by examiner

METHODS, SYSTEMS, AND COMPUTER READABLE MEDIA FOR PROVIDING APPLICATION LAYER FIREWALL AND INTEGRATED DEEP PACKET INSPECTION FUNCTIONS FOR PROVIDING EARLY INTRUSION DETECTION AND INTRUSION PREVENTION AT AN EDGE NETWORKING DEVICE

RELATED APPLICATIONS

This application claims the benefit of U.S. Provisional Patent Application Ser. No. 61/314,568 filed Mar. 16, 2010; the disclosure of which is incorporated herein by reference in its entirety.

TECHNICAL FIELD

The subject matter described herein relates to intrusion detection and intrusion prevention in a networking device. More specifically, the subject matter relates to methods, systems, and computer readable media for an application layer firewall function including an integrated deep packet inspection function for providing early intrusion detection and intrusion prevention at an edge networking device.

BACKGROUND

Conventional layered network security is often implemented using a combination of intrusion detection and prevention systems. Intrusion detection (ID) is the process of monitoring events occurring in a computer system or network and analyzing them for signs of possible violations or imminent threats of violation of computer security policies, acceptable use policies, or standard security practices. Therefore, an intrusion detection system (IDS) is a network security device or application that monitors network and/or system activities for malicious activities or policy violations and produces reports. Intrusion prevention (IP), on the other hand, is the process of attempting to stop detected potential intrusion incidents. Therefore, an intrusion prevention system (IPS) is a network security device or application that can react, in real-time, to block or prevent malicious or unwanted network and/or system activities.

Conventional approaches to IPS/IDS have included building independent point solutions to provide security such as placing dedicated devices, each having discrete functionality, at various locations in the network in front of one or more protected devices. For example, conventional methods may surround core call processing devices such as session border controller (SBC), class 4 or class 5 network switches, media gateways, and other elements within the service provider network with security detection devices to provide maximum coverage. In the conventional approach, deep packet inspection and firewall functions are provided by devices external to an SBC. One such conventional multi-device solution is illustrated in FIG. 1.

Figure 1:
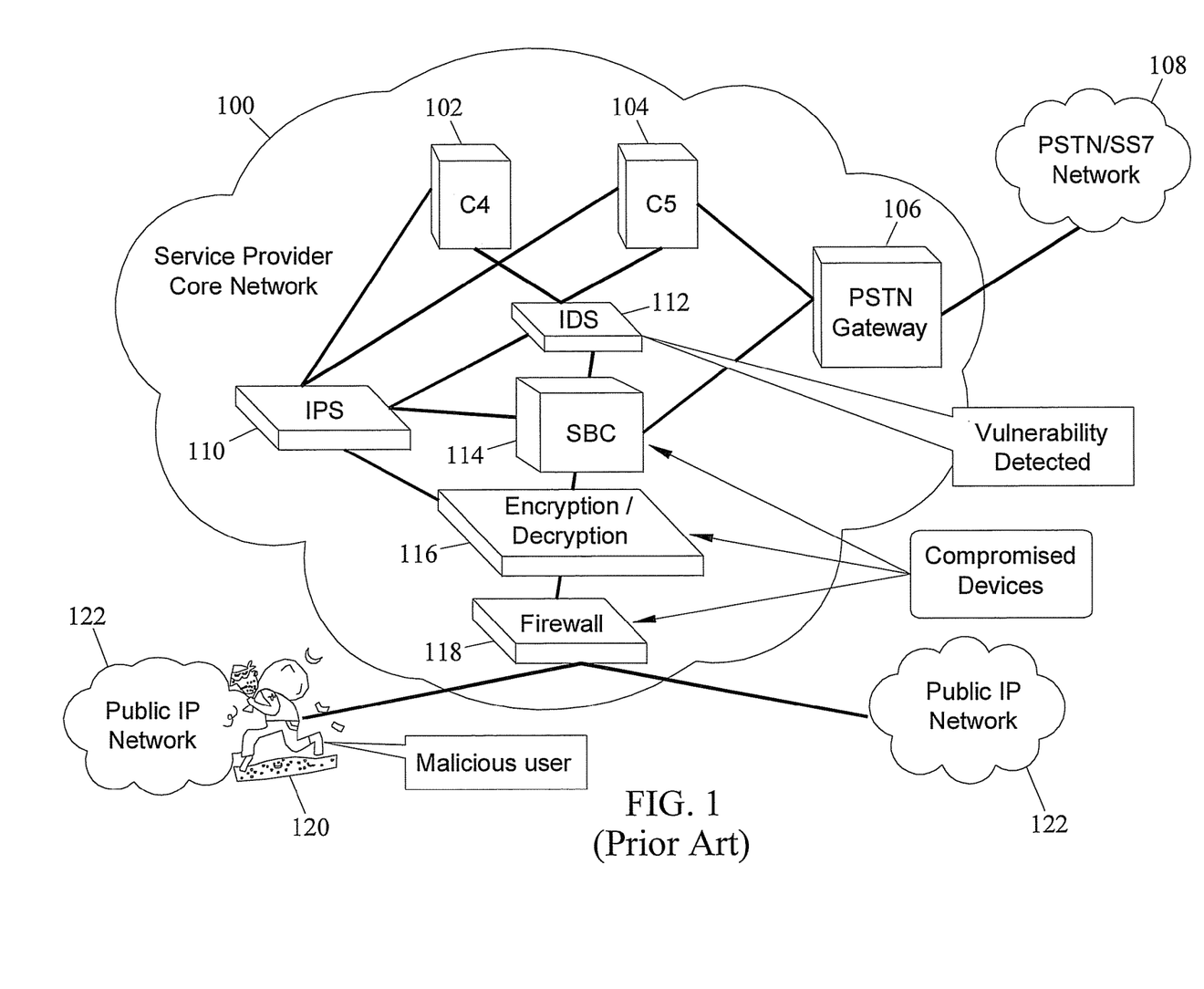
FIG. 1 is a network diagram of a conventional solution including separate SBC and DPI/firewall devices.

FIG. 1 is a network diagram of a conventional solution including separate SBC and DPI/firewall devices. FIG. 1 represents a logical layout of various components and devices that may be used in a service provider network for providing service protection. Typically, security and vulnerability detection devices may be deployed in the service provider network in-line of the packet flow between service provider and public networks.

Referring to FIG. 1, network 100 may include a service provider core communications network connecting various access communications networks, such as signaling system number 7 (SS7)-based networks (e.g., public switched telephone network (PSTN)) and Internet protocol (IP)-based networks (e.g., Internet). Network 100 may include one or more devices for translating communications between network types while maintaining security for protected areas. For example, network 100 may include class 4 switch 102, class 5 switch 104, and PSTN gateway 106. PSTN gateway 106 may include a network node equipped for interfacing with another network that uses different protocols, such as PSTN 108. Network 100 may also include one or more devices for providing layered network security for protected network devices such as class 4 switch 102, class 5 switch 104, and PSTN gateway 106. For example, intrusion prevention system 110, intrusion detection system 112, SBC 114, encryption/decryption device 116, and deep packet inspection (DPI)/firewall 118 may be located between devices 102-106 and public IP networks 122.

SBC 114 may be a device used in a voice over Internet protocol (VoIP) network to exert control over the signaling and media streams associated with setting up, conducting, and tearing down telephone calls or other interactive media communications. SBC 114 may assist policy administrators in managing the flow of session data across these borders. Additionally, SBC 114 may provide measurement, access control, and data conversion facilities for the calls they control. SBC 114 may be inserted into the signaling and/or media paths between calling and called parties in a VoIP call, such as those using session initiation protocol (SIP), H.323, or media gateway control protocol (MGCP) call signaling protocols.

DPI/firewall 118 may include any IP network equipment which is not an endpoint, such as a separate device communicatively coupled with SBC 114, for using non-header packet information (e.g., payload) to for search for protocol non-compliance, viruses, spam, intrusions, or other predefined criteria to decide what actions to take on the packet, including collecting statistical information. DPI/firewall 118 may also block unauthorized access while permitting authorized communications. For example, DPI/firewall 118 may be connected to public IP network 122 which may include an integrated access device (IAD) (not shown). IAD (not shown) may be a customer premises device that provides access to wide area networks and the Internet. Specifically, IAD (not shown) may aggregate multiple channels of information including voice and data across a single shared access link to a carrier or service provider point of presence (PoP). The access link may be a T1 line, a DSL connection, a cable television (CATV) network, a broadband wireless link, or a metro-Ethernet connection. Public IP network 122 may also include IP phones, 3G phones, dual-mode phones, and IP private branch exchanges (PBX). An IP PBX may include a telephone system designed to deliver voice or video over network 100 and interoperate with PSTN 108.

It may be appreciated that the approach shown in FIG. 1 does not provide for early detection of intrusion incidents or minimizing exposure to key network elements. Therefore, with the conventional approach, it is possible for malicious users to proliferate attacks into key parts of the service provider network. For example, FIG. 1 illustrates a scenario in which malicious user 120 transmits packets containing vulnerabilities that are detectable only via IDS 112. According to the conventional approach shown in FIG. 1, detection of this vulnerability does not occur until the packet has traversed firewall 118, encryption/decryption device 116, and SBC 114. By doing so, malicious user 120 may potentially corrupt or disrupt key devices in the packet processing path (e.g., devices 114-118) before the vulnerability is detected and/or a corrective action can be performed. Because the affected devices (e.g., devices 114-118) are key entry points in network 100, this may also disrupt service for other legitimate users in network 100.

One problem associated with conventional layer 3 DPI/firewall devices is that it does not support early detection nor does it minimize exposure to key network elements. For example, with the conventional approach it is possible for malicious users to proliferate attacks into key parts of the service provider network.

Another problem with the conventional approach shown in FIG. 1 is that they lack the ability to analyze traffic flow from a session layer perspective (e.g., layer 5). As a result, conventional layer 3 DPI/firewall devices are unable to identify behavioral vulnerabilities based on service usage, session layer protocol vulnerabilities (e.g., SPIT/SPAM in SIP signaling), or service fraud and theft of service. As a result, conventional layer 3 DPI/firewall devices do not fully protect service provider network against all known vulnerabilities.

Another problem associated with conventional layer 3 DPI/firewall devices (i.e., combined solutions) is that coordinating across multiple devices is necessary to protect against some vulnerabilities. In order to rapidly close a vulnerability discovered by the IDS module, coordination is required. However, coordination across multiple devices is often not achievable, thereby exposing the network to security vulnerabilities for possibly extended periods of time.

Another problem associated with conventional layer 3 DPI/firewall devices is that they do not scale well. In the conventional approach encryption/decryption task is typically performed on a dedicated device. Further, packet inspection and vulnerability detection stages have to be placed after the encryption/decryption module as these modules won't be able to function on encrypted packets. The issue with this is that encrypt/decrypt module would need to process all traffic including those that include potential vulnerabilities.

Accordingly, in light of these difficulties, a need exists for improved methods, systems, and computer readable media for providing layered network security for detecting and blocking attempted network intrusions or other security policy violations as early as possible at the edge of the network.

SUMMARY

Methods, systems, and computer readable media for an application layer firewall function including an integrated deep packet inspection function for providing early intrusion detection and intrusion prevention at an edge networking device are disclosed. According to one method, steps are performed at a session controller configured to operate at the border of a first network and a second network. The steps include receiving, at an intrusion protection system (IPS) module of the session controller that interfaces with modules associated with layers 2 and above of a protocol stack of the session controller, information gathered by modules located at lower layers and associated with an intrusion attempt, vulnerability, or other security policy violation. In response to receiving the information, the IPS module provides at least one of a security policy and a rule to a module located at the most appropriate layer for securing the intrusion attempt, vulnerability, or other security policy violation.

A session controller configured to operate at the border of a first network and a second network for providing application layer firewall functionality including integrated deep packet inspection, intrusion detection, and intrusion prevention capabilities is also disclosed. The session controller includes a plurality of modules associated with layers 2 and above of a protocol stack of the session controller. An intrusion protection system (IPS) module interfaces with the plurality of modules and receives information gathered by modules located at lower layers and associated with an intrusion attempt, vulnerability, or other security policy violation. In response to receiving the information, the IPS module provides at least one of a security policy and a rule to a module located at the most appropriate layer for securing the intrusion attempt, vulnerability, or other security policy violation.

The subject matter described herein for an application layer firewall function including an integrated deep packet inspection function for providing early intrusion detection and intrusion prevention at an edge networking device may be implemented using a computer readable medium to having stored thereon executable instructions that when executed by the processor of a computer control the processor to perform steps. Exemplary computer readable media suitable for implementing the subject matter described herein include non-transitory computer readable media, such as chip memory devices or disk memory devices accessible by a processor, programmable logic devices, and application specific integrated circuits. In addition, a computer readable medium that implements the subject matter described herein may be located on a single computing platform or may be distributed across plural computing platforms.

BRIEF DESCRIPTION OF THE DRAWINGS

The subject matter described herein will now be explained with reference to the accompanying drawings of which.

DETAILED DESCRIPTION

The subject matter described herein includes methods, systems, and computer readable media for an application layer firewall function including an integrated deep packet inspection function for providing early intrusion detection and intrusion prevention at an edge networking device. A session controller is integrated with an intrusion detection and prevention system where various intrusion detection and DPI technologies are strategically placed in the session controller flow. By integrating IDS functionality deep within edge devices, which are often best suited to shut down or block the security vulnerabilities, the subject matter described herein provides for improved functional segmentation, knowledge collection, and a comprehensive security framework at the edge of the network. As a result, the subject matter described herein has several advantages over conventional solutions.

One advantage of the subject matter described herein is that it is both high performance and scalable. The subject matter described herein relies on early detection (and discarding) of packets that don't meet the security criteria established for the network. This allows network operators to block packets that won't meet prescribed layer 2/3 (at pre encryptions stage) policies in their network. As a direct result, this design operates only on the sessions that are legitimate (from pre-encryption rules standpoint). This is advantageous over conventional mass encryption/decryption method because the initial stages may filter out potential malicious traffic. When this is applied to high layer encryption protocols such as TLS (layer 4), network operators can be guaranteed that the device that is decrypting TLS traffic has met all the policies and rules defined at layers 1, 2, and 3.

Another advantage of the subject matter described herein includes better security through tighter integration of IPS and DPI capabilities in the OSI layer stack. For example, an administrator can precisely control security policies at each OSI service layer in order to dynamically and rapidly react to and close new vulnerabilities.

As part of providing comprehensive security framework to devices at the edge of the network, the subject matter described herein operates on the basic principles of early detection, dedicated and specialized security functions tailored for attacks at each layer of the OSI network model, and real-time continual learning and adaptation to the threat patterns in live networks. This contrasts with prior approaches which include building point solutions at each layer.

As mentioned above, one advantage of the subject matter described herein includes functional segmentation. By focusing on segmentation and compartmentalization of functions into a dedicated module at each layer, the subject matter described herein may provide maximum flexibility to catch, adjust, and adapt to known (and unknown) security threats in the network. Interlinked and meshed connectivity of various modules may provide an express communication path for early reporting of threat detection as well as a fast conduit for higher layer modules to block the detected threats in a rapid fashion.

Another advantage of the subject matter described herein includes knowledge collection. According to one aspect, the system may detect complex security attacks by piecing together information from various modules of the system. This allows prevention of highly complex attacks via adjustments to system rules and policies at a granular level. For example, the subject matter described herein may position intrusion detection functionality in a non-traditional setting. Traditionally, IDS systems are offline and deployed as probes in the network. Therefore, they may only detect behavioral- or usage pattern-based vulnerability or security attacks after the attack has occurred; and a corrective action would occur after initial propagation of the attack. In contrast to traditional IDS systems, the subject matter described herein integrates IDS functionality deep within edge devices which are often best suited to shut down or block the security vulnerabilities.

Figure 2:
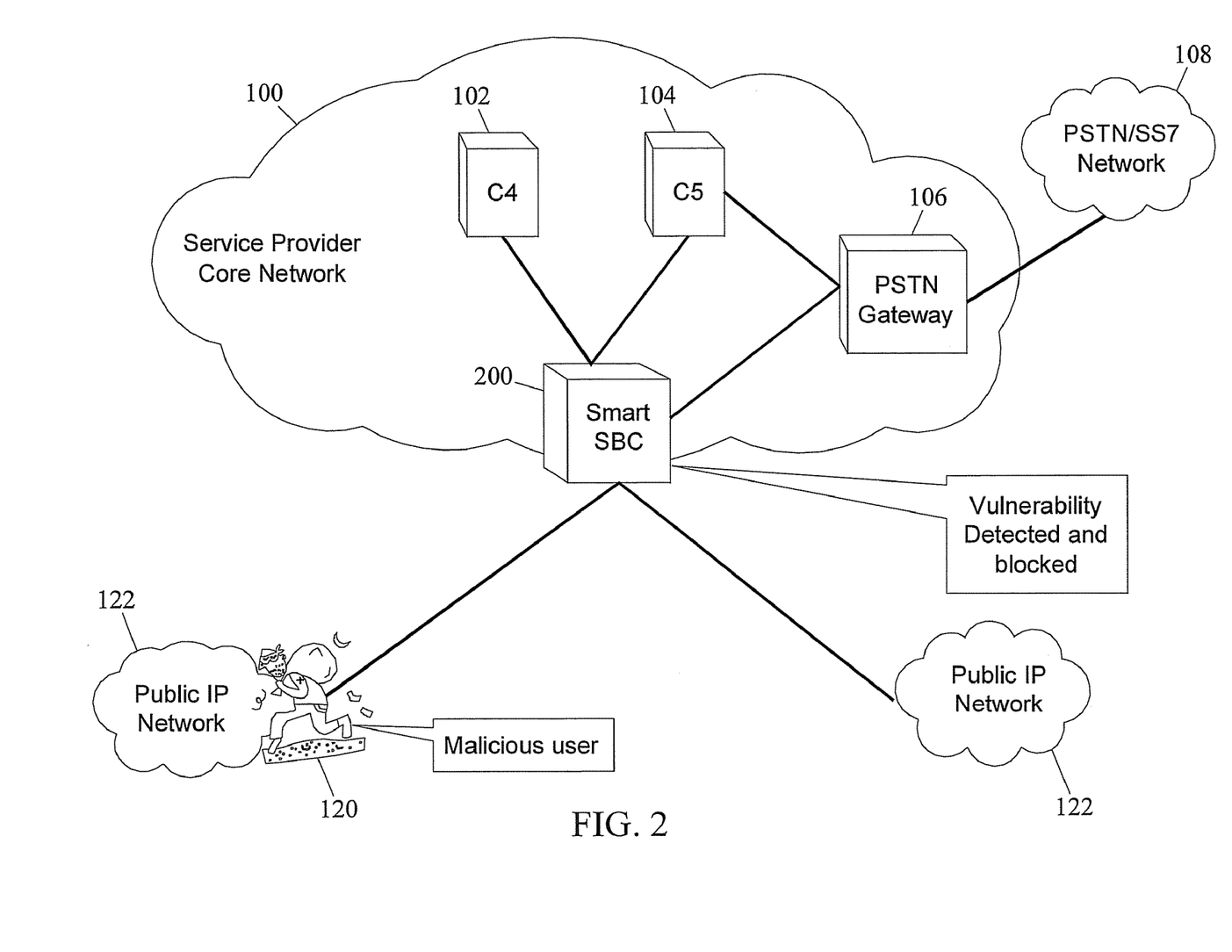
FIG. 2 is a network diagram including a session controller with integrated intrusion detection and prevention capabilities in line with traditional session controller functions for providing an application layer firewall function including an integrated deep packet inspection function for providing early intrusion detection and intrusion prevention at an edge networking device according to an embodiment of the subject matter described herein.

FIG. 2 is a network diagram including a session controller with integrated intrusion detection and prevention capabilities in line with traditional session controller functions according to an embodiment of the subject matter described herein. FIG. 2 represents a logical layout of various exemplary components and devices that may be implemented in a service provider network for providing layered network service protection. The security and vulnerability detection devices may be deployed in service provider network 100 in-line of the typical packet flow between service provider network 100 and public IP networks 122. Referring to FIG. 2, network 100 may include a "smart" SBC 200 for protecting class 4 switch 102, class 5 switch 104, and PSTN gateway 106 from malicious user 120. Smart SBC 200 may integrate encryption/decryption, IPS, IDS, DPI, and firewall functionality formerly found in separate dedicated devices 110, 112, 116, and 118 in the conventional layered network security solution shown in FIG. 1.

In contrast to the attempted intrusion scenario described above in FIG. 1, according to the embodiment shown in FIG. 2, vulnerability detection may be implemented at the boundary of service provider network 100. By placing IPS, IDS, DPI, and firewall functionality at the edge of network 100, vulnerabilities may be kept out of service provider's network 100, thereby ensuring that other intermediary devices in network 100 are not compromised. Additionally, because threats may be blocked at the edge of network 100, legitimate users may continue to access services from their service provider. It is appreciated that the above scenario is intended to be exemplary and not limiting. Additional types of intrusions or attacks not specifically enumerated may also be detected and/or prevented by smart SBC 200 without departing from the scope of the subject matter described herein.

Figure 3:
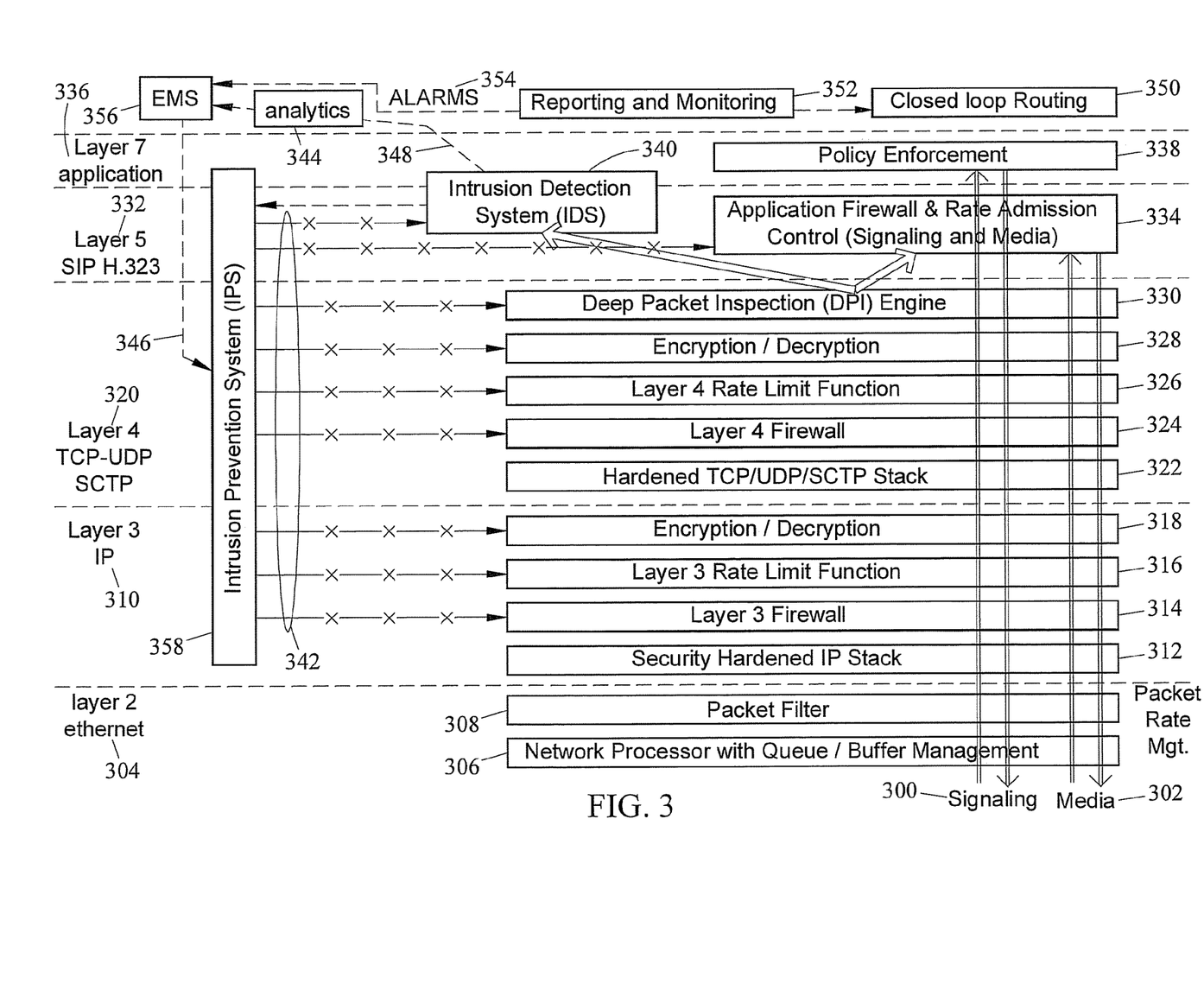
FIG. 3 is a functional block diagram of an exemplary OSI layer stack including an application layer firewall function including an integrated deep packet inspection function for providing early intrusion detection and intrusion prevention at an edge networking device according to an embodiment of the subject matter described herein.

FIG. 3 is a functional block diagram of an exemplary OSI layer stack including an application layer firewall function including an integrated deep packet inspection function for providing early intrusion detection and intrusion prevention at an edge networking device according to an embodiment of the subject matter described herein. Referring to FIG. 3, received packets may be processed by successively higher layers beginning with layer 1 (not shown). Received packets may generally be divided into signaling packets 300 and media packets 302, where signaling packets 300 may be associated with signaling and media packets 302 are associated with media content. Generally, modules 306-330 (located at layers 4 and below) may be responsible for receiving a communications message, processing the communications message at successively higher layers of the integrated and hardened IP communications stack. Further, modules 306-330 may detect, based on the communications message, whether the communications message is associated with an intrusion attempt or other security policy violation, such that the intrusion attempt is detected at the earliest possible layer of the stack. The communications message is thus prevented from being processed by the layers above layer at which the intrusion attempt was detected. For example, when a packet is received, the packet may initially be processed by layer 2 (Ethernet) 304 (layer 1, the physical layer does not perform any processing relevant to the subject matter described herein and therefore is not shown for simplicity). Layer 2 304 may include a network processor with queue/buffer management 306 and a packet filter 308.

Network processor with queue/buffer management 306 may be implemented at layer 1 and layer 2 of the OSI networking architecture and may be responsible for reception and transmission of all in-/out-bound network traffic to smart SBC 200. Smart SBC 200 may include multiple physical network interfaces. Network processor with queue/buffer management 306 may also be responsible for managing traffic on all physical network interfaces. Queuing and buffer management capabilities in network processor with queue/buffer management 306 may ensure that smart SBC 200 may transmit and receive packets at line rates (i.e. full stated capacity of physical interfaces).

Packet filter 308 may reside between layer 2 network processor module 306 and layer 3 310 based-security hardened IP stack 312. Packet filter 308 may introduce minimal latency and may be used as an entry level filtering mechanism to discard non-IP packet being processed by higher layer.

Next, packets may be processed by layer 3 310. Layer 3 310 may include a security hardened IP stack 312, a layer 3 firewall 314, a layer 3 rate limit function 316, and an encryption/decryption layer 318.

Security-hardened IP stack 312 may be the first module in the IP layer (Layer 3 of OSI model) of the network and may provide IP layer 3 processing for all received/outgoing packets. Security-hardened IP stack 312 may be different from a conventional IP stack in that security-hardened IP stack 312 may protect network 100 and smart SBC 200 against well known IP layer security vulnerabilities (e.g. Ping of Death).

Layer 3 firewall 314 may reside between security-hardened IP stack 312 and layer 3 rate limit function module 316 and may provide flexible firewalling capability at layer 3. Rules included in layer 3 firewall 314 may define one or more sets of peer endpoints with which smart SBC 200 may be authorized to communicate. Layer 3 firewall 314 may ensure that higher layer functions process network traffic only from allowed network peers and partners.

Layer 3 rate limit function 316 module may regulate the rate of arrival of IP packets from authorized network peer devices. Layer 3 rate limit function 316 may protect against denial of service and packet flooding attacks originating from authorized peer. As an example, layer 3 rate limit function 316 may address denial of service threats from a compromised authorized IP device. Because the endpoints are authorized, such attacks may not be detected at layer 2/3 modules, but would be detected by a regulating module such as layer 3 rate limit function 316 which ensures that a particular device (whether authorized or not) is not negatively impacting overall service for other subscribers and customers.

Encryption/decryption layer 318 may be the last functional module within layer 3 stack and may be relevant for solutions that require layer 3 encryption mechanisms such as IP security (IPsec). Encryption/decryption layer 318 may provide line rate encryption and decryption services for very large scale sessions. For example, encryption/decryption layer 318 may support encryption and decryption services for between approximately 100,000 to 1,000,000 unique sessions processed through smart SBC 200.

Next, packets may be processed by layer 4 320 which may include transmission control protocol (TCP), user datagram protocol (UDP), and stream control transmission protocol (SCTP). Layer 4 320 may include a hardened TCP/UDP/SCTP stack 322, a layer 4 firewall 324, a layer 4 rate limit function 326, an encryption/decryption layer 328, and a deep packet inspection (DPI) engine 330.

Hardened TCP/UDP/SCTP stack 322 module may mark the beginning of packet processing from layer 3 to layer 4 of the OSI network model. Hardened TCP/UDP/SCTP stack 322 module may receive packets from either Layer 3 rate limit function 316 or, in some cases, hardened TCP/UDP/SCTP stack 322 module may receive packets from encryption/decryption layer 318. Hardened TCP/UDP/SCTP stack 322 module may provide traditional layer 4 functions for TCP, UDP and SCTP transports. Similar to a hardened IP stack 312, hardened TCP/UDP/SCTP stack 322 may be specially strengthened to detect and prevent security vulnerabilities in the TCP, UDP and SCTP protocols. Examples of such attacks may include TCP SYN flooding and tear drop attacks.

Layer 4 firewall 324 module may reside between the hardened TCP/UDP Stack 322 and layer 4 rate limiting module 326. Layer 4 firewall 324 module may provide firewall function for layer 4 protocols. Layer 4 firewall 324 module may regulate the specific services and applications enabled on smart SBC 200. For example, layer 4 firewall 324 module may be configured to allow only TCP services associated with secure shell (ssh) or call control services. Network operators may use rules implemented by layer 4 firewall 324 module to block access to specific services not required to be enabled on the SBC (e.g. telnet, ftp, etc).

Layer 4 rate limit function 326 module may regulate the rate of arrival of packets from authorized network peer devices based on layer 4 protocols such as TCP, UDP or SCTP. Therefore, layer 4 rate limit function 326 ensures protection against denial of service attacks and packet flooding attack originating from authorized peer within the confines of allowed services.

Encryption/decryption layer 328 may include the last functional module within the layer 4 stack. Encryption/decryption layer 328 may be relevant for solutions that require layer 4 encryption services such as transport layer security (TLS), datagram transport layer security (DTLS) and secure real time transport protocol (SRTP). Similar to layer 3 encryption/decryption module 318, encryption/decryption layer 328 may be an optional entity that provides line rate encryption and decryption services for very large scale sessions, but for encryption methods based on layer 4 transport protocols. Typically, encryption/decryption layer 328 module may support encryption and decryption services for approximately 100,000-1,000,000 unique sessions processed through each SBC device.

Deep packet inspection (DPI) engine 330 may reside at the boundary of layer 4 and layer 5 of the OSI reference network stack. Deep packet inspection engine 330 may be responsible for scrupulous and through review of the contents of the payload of received packets. Modules positioned in layers 2 thru 4 may protect the system against protocol specific vulnerabilities. Higher order functions (e.g., layer 5 and above) may be tightly integrated and therefore produce more complex vulnerabilities introduced by virtue of behavioral patterns, usage patterns, service dynamics, commercial considerations and other related aspects. Specifically, deep packet inspection engine 330 may scan the payload of the packets to detect presence of well known vulnerability signatures within the contents of the payload. Deep packet engine 330 may also identify the nature of the traffic (e.g. voice, video, file transfers, etc). This information may be used by DPI engine 330 to guard against vulnerabilities and provide realtime intelligence to drive traffic shaping and traffic modeling schemes.

According to one aspect, deep packet inspection 300 may simultaneously feed both layer 5/6 modules as well as transmit packets, via parallel paths, to intrusion detection module (IDS) 340. In addition to the inline processing of the packets by traditional layer 5/6 modules, IDS module 340 may investigate behavioral and usage pattern based vulnerabilities in the packet flow not only across an individual session but across collective of the sessions and packets streams flowing through the system.

Application firewall and rate admission control module 334 may provide firewall and rate control at layers 5 and 6. Essentially, application firewall and rate admission control module 334 may provide the flexibility to define specifically which services and applications are acceptable and which are to be denied. Consider an example where realtime multimedia content (bearer) exchange occurs using UDP. For example, the bearer (content or media) part of applications such as video sharing, video on demand, VoIP sessions, music streaming, push to talk, etc may all use UDP. While firewall modules 314 and 324 located at layers 3 and 4, respectively, may provide granular control to allow or block UDP protocol, they cannot provide the ability to discriminate against specific application using UDP. For instance, if there is a need to only allow video-share and video-on-demand services on an operator's network (e.g. Netflix) while blocking other UDP-based traffic, such an action cannot be accomplished via layer 3/4 firewall control because this would require deep packet inspection service to identify and tag the nature of the UDP traffic flowing thru the system and then firewall functionality at layer 5/6 provided by application firewall and rate admission control module 334 to enforce the operator's desired policy relative to UDP protocol.

Policy enforcement module 338 may work in conjunction with other layer 5/6 modules. Specific operator policies relative to allocation of system resources, rights, and privileges, may be monitored and applied to each packet flow in the system. Continuing the previous example of a video-share application, relevant policies may include factors such as bandwidth usage per subscriber, video quality, codecs, compression, and digital content rights management. While modules positioned in layers 1 thru 6 work to ensure that security vulnerabilities are screened and removed so that only video-hare content is being streamed to authorized users, policy enforcement engine 338 may ensure that service is being delivered within general boundaries of the solution (e.g. appropriate bandwidth allocation per user or subscribed service, protection of intellectual property, use of appropriate video compression, etc).

Intrusion detection system 340 may continuously analyze various packet flows in network 100 to identify and isolate behavior and pattern based security attacks. Behavioral and usage pattern attacks often are launched as a distributed coordinated multi user targeted attacks on the system. Examples of such attacks could include masqueraded fake emergency calls having the malicious intent of overwhelming first responders, targeted distribution of pirated content over file sharing network in small chunks, toll-fraud, etc. In these examples, the static policies defined and implemented at layers 1 thru 6 may be unable to catch such violations because the flows appear to be legitimate and are therefore not tagged. These issues are discovered only when one looks at it in a collective fashion. IDS systems, such as IDS module 340, may be designed specifically for such complex analysis.

Reporting and monitoring module 352 may be a layer 7 function responsible for collecting metrics from other modules and reporting the information to a centralized management system such as an element management system (EMS).

Closed-loop routing module 350 may update smart SBC 200's internal routing tables. Such updates may become necessary to guard against security vulnerabilities emanating from specific parts of a network.

Element management system (EMS) 356 may be a separate device from smart SBC 200 that is responsible for configuration, provisioning, fault, alarm and performance monitoring of one or more SBC devices deployed in the network. Reporting and monitoring module 352 may be constantly collecting and passing on relevant system-related information to EMS 356. EMS 356 may provide operators a view into the inner workings of smart SBC 200 and specifically which vulnerabilities and threats are being detected at various layers in device 200. EMS 356 may also provide administrators with the ability to alter overall security policies, provision new rules services and allows them to control the behavior and functioning of smart SBC 200.

Intrusion prevention system (IPS) module 358 may interface with all modules at every layer of operation. While all other modules in the system described above are primarily deployed in the detect and prevent mode of operation, IPS 358 may, on the other hand, be tasked with dynamically institutionalizing new protection mechanisms and schemes in response to discoveries at every layer of smart SBC 200. As a result, an interface to each module allows IPS module 358 to regulate policies and rules at the most appropriate layer to further strengthen the security framework of the SBC device. For example, the IPS 358 may work with DPI engine 330 to upload new vulnerability signatures that DPI engine 330 needs to monitor on ongoing basis. Similarly IPS 358 may make a rule change in application layer 3 firewall module in response to discovery of new IP protocol related vulnerability.

Figure 4A:
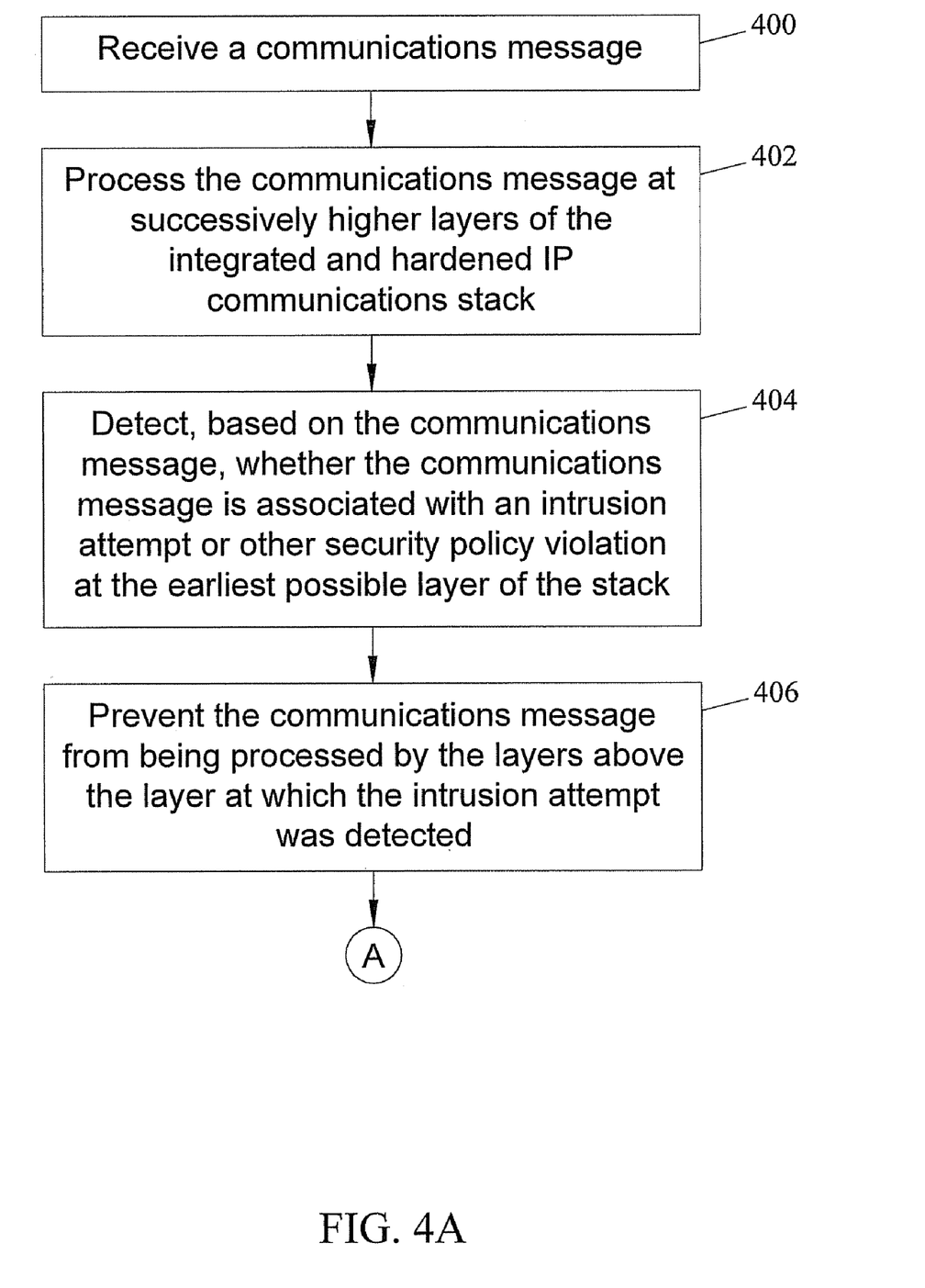
FIG. 4 is a flow chart of an exemplary process for an application layer firewall function including an integrated deep packet inspection function for providing early intrusion detection and intrusion prevention at an edge networking device according to an embodiment of the subject matter described herein.
Figure 4B:
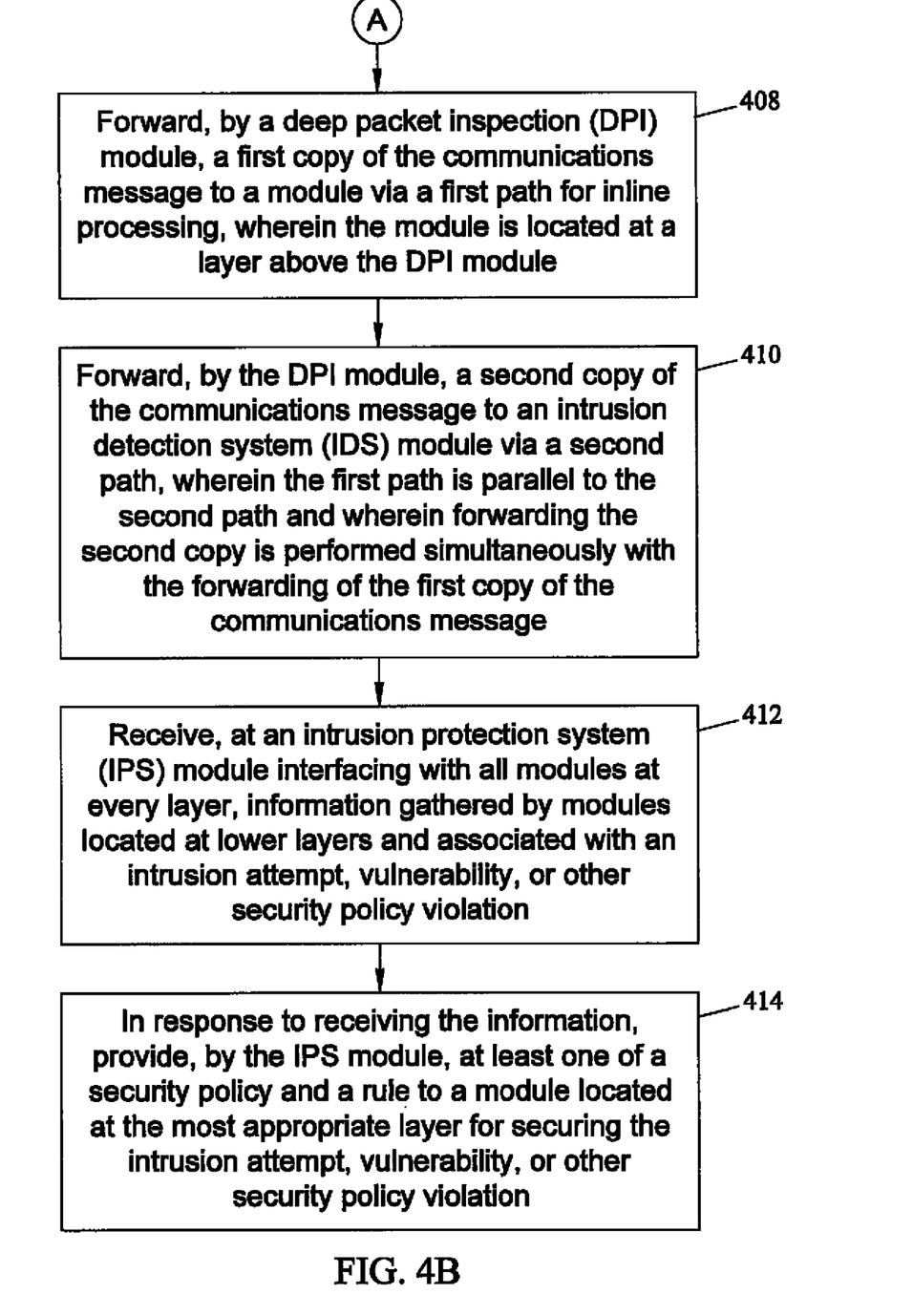

FIG. 4 is a flow chart of an exemplary process for an application layer firewall function including an integrated deep packet inspection function for providing early intrusion detection and intrusion prevention at an edge networking device according to an embodiment of the subject matter described herein. Referring to FIG. 4, in step 400, a communications message may be received. For example, an IP-based packet may be received by a communications module of a packet forwarding device located at the border between two networks such as an SBC.

In step 402, the communications message may be processed at successively higher layer of the integrated and hardened stack. For example, modules 306-330 located at layers 4 and below which are described above with respect to FIG. 3 may process received messages. Signaling and media packets may each be processed by the various layers, beginning with lower layer functions such as layer 2 packet rate management, then moving on to layer 3 firewall and rate limit functions, and finally to layer 4 firewall and rate limit functions.

In step 404, it may be detected whether the communications message is associated with an intrusion attempt or other security policy violation at the earliest possible layer of the stack. For example, if a particular type of attack is detectable at rate limit modules 316 and 326 located at layer 3 and layer 4, respectively, then the attack is detected at layer 3 because it would process the message before layer 4 in the communications stack, so that an action can be taken on the message as early as possible and so that higher layers are not compromised.

In step 406, the communications message may be prevented from being processed by layers above the layer at which the intrusion attempt was detected. For example, if a particular type of attack is detected and blocked by layer 3 rate limit function 316, then the packet is not passed to higher layers and is therefore prevented from being processed by modules 318-330 located at layers 4 and above.

In step 408, a first copy of the communications message may be forwarded by the DPI module via a first path to a higher layer module for inline processing. For example, an IP packet may be forwarded by DPI module 330 to application firewall and rate admission control module 334, where it may be examined for, among other things, SIP protocol vulnerabilities, SPAM, and SPIT.

In step 410, the DPI module may simultaneously forward a second copy of the communications message to an intrusion detection module via a second path, where the first and second paths are parallel to each other. For example, DPI module 330 may forward a second copy of the IP packet to IDS module 340. As described above, IDS module 340 may discover vulnerabilities or attacks when packets are examined in a collective fashion and isolate behavior and pattern based security attacks.

In step 412, information gathered by modules at lower layers that may be associated with an intrusion attempt, vulnerability, or other security policy violation, may be received by an intrusion protection module that interfaces with every module at every layer. For example, in one embodiment IPS module 358 may receive alarms from IDS module 340 and generate one or more rules for securing a vulnerability. In another embodiment, IPS module 358 may receive one or more rules automatically generated by IDS module 340. In another embodiment, IPS module 358 may receive analytics from EMS module 356 in order to generate one or more rules for securing a vulnerability. In yet another embodiment, IPS module 358 may directly receive rules manually created or edited by a human operator via EMS 356.

In step 414, the IPS module 358 may provide at least one of a security policy and a rule to a module that is located at the most appropriate layer for securing the intrusion attempt, vulnerability, or other security policy violation. For example, in one embodiment IPS module 358 may work with DPI module 330 to upload new vulnerability signatures that DPI engine needs to monitor on ongoing basis. Similarly the IPS module 358 may make a rule change in application layer 3 firewall module in response to discovery of new IP protocol related vulnerability.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for providing application layer firewall functionality including integrated deep packet inspection, intrusion detection, and intrusion prevention capabilities, the method comprising:
    at a session controller configured to operate at the border of a first network and a second network:
    receiving, at an intrusion protection system (IPS) module of the session controller interfacing with modules associated with layers 2 and above of a protocol stack of the session controller, information gathered by modules located at layers lower than the IPS and associated with an intrusion attempt, vulnerability, or other security policy violation;
    in response to receiving the information, providing, by the IPS module, at least one of a security policy and a rule to a module located at a targeted layer for securing against the intrusion attempt, vulnerability, or other security policy violation;
    forwarding, by a deep packet inspection (DPI) module, a first copy of a received communications message to an application firewall and rate admission control module located at layers 5 and 6 of the stack via a first path for in-line processing, wherein the application firewall and rate admission control module is located at a layer above the DPI module; and
    forwarding a second copy of the communications message to an intrusion detection system (IDS) module via a second path, wherein the first path is parallel to the second path and wherein forwarding the second copy is performed simultaneously with the forwarding of the first copy of the communications message.

2. The method of claim 1 comprising applying, by a module located at a lower layer, the at least one of a security policy and a rule.

3. The method of claim 1 comprising generating a report including information associated with the intrusion attempt.

4. The method of claim 1 wherein receiving information includes receiving an Internet protocol (IP)-based packet.

5. The method of claim 1 wherein receiving information associated with an intrusion attempt, vulnerability, or other security policy violation includes receiving a communications message associated with one of a signature-based anomaly, usage-based anomaly, SIP protocol vulnerability, denial of service (DoS) attack, spam attack, and spam over Internet telephony (SPIT) attack.

6. The method of claim 1 wherein providing at least one of a security policy and a rule includes providing a vulnerability signature to a deep packet inspection (DPI) module for monitoring packets on an ongoing basis.

7. The method of claim 6 wherein the DPI module resides at the boundary of layer 4 and layer 5 of the stack and scans the payloads of received packets to detect the presence of a vulnerability signature, identifies the nature of the packet.

8. The method of claim 1 wherein the information is associated with one of voice, video, and file transfer.

9. The method of claim 1 wherein the IDS module is located at layers 5, 6, and 7 of the stack.

10. The method of claim 1 wherein the IPS module interfaces with a layer 3 security-hardened IP stack located above a layer 2 packet filter and below a layer 3 firewall.

11. The method of claim 1 wherein the IPS module interfaces with a layer 3 firewall located above a layer 3 security-hardened IP stack and below a layer 3 rate limit function.

12. The method of claim 1 wherein the IPS module interfaces with a layer 3 rate limit function located above a layer 3 firewall and below a layer 3 encryption/decryption module.

13. The method of claim 1 wherein the IPS module interfaces with a layer 3 encryption/decryption module located above a layer 3 encryption/decryption module and below a layer 4 security-hardened TCP/UDP/SCTP stack.

14. The method of claim 1 wherein the IPS module interfaces with a layer 4 security-hardened TCP/UDP/SCTP stack located above a layer 3 and below a layer 4 firewall.

15. The method of claim 1 wherein the IPS module interfaces with a layer 4 firewall located above a layer 4 security-hardened IP stack and below a layer 4 rate limit function.

16. The method of claim 1 wherein the IPS module interfaces with a layer 4 rate limit function located above a layer 4 firewall and below a layer 4 encryption/decryption module.

17. The method of claim 1 wherein the IPS module interfaces with a layer encryption/decryption module located above a layer 4 encryption/decryption module and below a layer 4 deep packet inspection engine.

18. A session controller configured to operate at the border of a first network and a second network for providing application layer firewall functionality including integrated deep packet inspection, intrusion detection, and intrusion prevention capabilities, the session controller comprising:
    a processor; and
    a memory, the memory comprising:
    a plurality of modules associated with layers 2 and above of a protocol stack of the session controller; and
    an intrusion protection system (IPS) module for:
        interfacing with the plurality of modules;
        receiving information gathered by the plurality of modules that is associated with an intrusion attempt, vulnerability, or other security policy violation; and in response to receiving the information, providing at least one of a security policy and a rule to a module of the plurality of modules that is located at a targeted layer for securing against the intrusion attempt, vulnerability, or other security policy violation; and a deep packet inspection (DPI) module for:

forwarding a first copy of the communications message to an application firewall and rate admission control module located at layers 5 and 6 of the stack via a first path for inline processing, wherein the application firewall and rate admission control module is located at a layer above the DPI module; and forwarding a second copy of the communications message to the DPI module via a second path, wherein the first path is parallel to the second path and wherein forwarding the second copy is performed simultaneously with the forwarding of the first copy of the communications message.

19. The session controller of claim 18 wherein the plurality of modules applies the at least one of a security policy and a rule by a module located at a lower layer.

20. The session controller of claim 18 wherein the session controller generates a report including information associated with the intrusion attempt.

21. The session controller of claim 18 wherein the session controller receives an Internet protocol (IP)-based packet.

22. The session controller of claim 18 wherein the session controller receives a communications message associated with an intrusion attempt, vulnerability, or other security policy violation includes receiving a communications message associated with one of a signature-based anomaly, usage-based anomaly, SIP protocol vulnerability, denial of service (DoS) attack, unsolicited email spam attack, and spam over Internet telephony (SPIT) attack.

23. The session controller of claim 18 wherein the IPS module provides at least one of a security policy and a rule includes providing a vulnerability signature to a deep packet inspection (DPI) module for monitoring packet on an ongoing basis.

24. The session controller of claim 18 comprising:

an intrusion detection system (IDS) module for identifying behavioral and usage pattern based vulnerabilities in a packet flow not across individual and collective sessions and packets streams.

25. The session controller of claim 24 wherein the DPI module resides at the boundary of layer 4 and layer 5 of the stack and scans the payloads of received packets to detect the presence of a vulnerability signature, identifies the nature of the packet.

26. The session controller of claim 18 wherein the nature of the communications message includes one of voice, video, and file transfer.

27. The session controller of claim 18 wherein the IDS module is located at layers 5, 6, and 7 of the stack.

28. The session controller of claim 18 wherein the IPS module interfaces with a layer 3 security-hardened IP stack located above a layer 2 packet filter and below a layer 3 firewall.

29. The session controller of claim 18 wherein the IPS module interfaces with a layer 3 firewall located above a layer 3 security-hardened IP stack and below a layer 3 rate limit function.

30. The session controller of claim 18 wherein the IPS module interfaces with a layer 3 rate limit function located above a layer 3 firewall and below a layer 3 encryption/decryption module.

31. The session controller of claim 18 wherein the IPS module interfaces with a layer 3 encryption/decryption module located above a layer 3 encryption/decryption module and below a layer 4 security-hardened TCP/UDP/SCTP stack.

32. The session controller of claim 18 wherein the IPS module interfaces with a layer 4 security-hardened TCP/UDP/SCTP stack located above a layer 3 and below a layer 4 firewall.

33. The session controller of claim 18 wherein the IPS module interfaces with a layer 4 firewall located above a layer 4 security-hardened IP stack and below a layer 4 rate limit function.

34. The session controller of claim 18 wherein the IPS module interfaces with a layer 4 rate limit function located above a layer 4 firewall and below a layer 4 encryption/decryption module.

35. The session controller of claim 18 wherein the IPS module interfaces with a layer 4 encryption/decryption module located above a layer 4 encryption/decryption module and below a layer 4 deep packet inspection engine.

36. A computer readable medium comprising computer executable instructions embodied in a non-transitory computer readable medium and when executed by a processor of a computer performs steps comprising:

at a session controller configured to operate at the border of a first network and a second network:

receiving, at an intrusion protection system (IPS) module of the session controller interfacing with modules associated with layers 2 and above of a protocol stack of the session controller, information gathered by modules located at layers lower than the IPS and associated with an intrusion attempt, vulnerability, or other security policy violation; and in response to receiving the information, providing, by the IPS module, at least one of a security policy and a rule to a module located at a targeted layer for securing against the intrusion attempt, vulnerability, or other security policy violation;

forwarding, by a deep packet inspection (DPI) module, a first copy of a received communications message to an application firewall and rate admission control module located at layers 5 and 6 of the stack via a first path for in-line processing, wherein the application firewall and rate admission control module is located at a layer above the DPI module; and forwarding a second copy of the communications message to an intrusion detection system (IDS) module via a second path, wherein the first path is parallel to the second path and wherein forwarding the second copy is performed simultaneously with the forwarding of the first copy of the communications message.

* * * * *